United States Patent [19]

Hampel et al.

[11] 4,009,088

[45] Feb. 22, 1977

[54] PROCESS FOR PRODUCING AQUEOUS SOLUTIONS OF SODIUM, AMMONIUM AND MAGNESIUM SULPHITE

[75] Inventors: Hans Joachim Hampel, Eschborn; Rolf Eggersdorfer, Bad Homburg, both of Germany; Alpo Johannes Ora, Rauma, Finland

[73] Assignee: Rauma-Repola Oy, Rauma, Finland

[22] Filed: Apr. 7, 1976

[21] Appl. No.: 674,554

Related U.S. Application Data

[63] Continuation of Ser. No. 665,851, March 10, 1976, abandoned.

[30] Foreign Application Priority Data

Mar. 10, 1975   Germany ........................... 2510343

[52] U.S. Cl. ........................... 204/180 P; 423/497; 423/519
[51] Int. Cl.² ......................................... B01D 13/02
[58] Field of Search ................ 204/180 P, 301, 72; 423/497, 519

[56] References Cited

UNITED STATES PATENTS

| | | | |
|---|---|---|---|
| 2,656,249 | 10/1953 | Gray et al. | 423/519 |
| 3,086,928 | 4/1963 | Schulz | 204/180 P X |
| 3,905,886 | 9/1975 | Wang | 204/180 P |

Primary Examiner—Arthur C. Prescott
Attorney, Agent, or Firm—Finnegan, Henderson, Farabow & Garrett

[57] ABSTRACT

A continuously operative electrochemical ion exchange process for producing sodium, ammonium or magnesium sulphite or hydrogen sulphite in an aqueous solution simultaneously with the production of a useful calcium salt as a by-product by subjecting an aqueous solution of a salt of sodium, ammonium, or magnesium to an electrodialysis procedure with an aqueous solution of calcium sulphite or calcium hydrogen sulphite.

10 Claims, 1 Drawing Figure

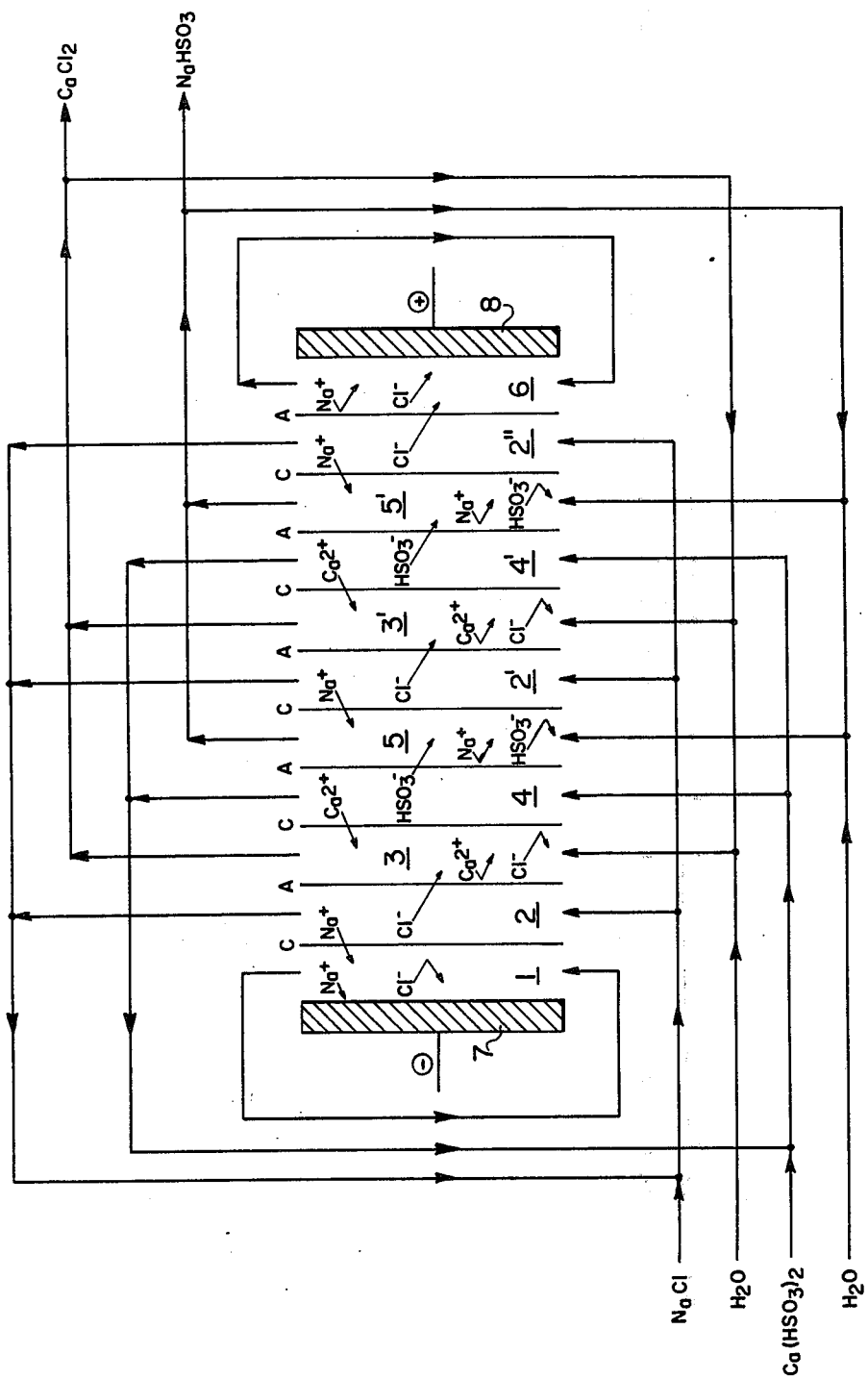

PROCESS FOR PRODUCING AQUEOUS SOLUTIONS OF SODIUM, AMMONIUM AND MAGNESIUM SULPHITE

This application is a continuation of U.S. application Ser. No. 665,851, filed Mar. 10, 1976, now abandoned.

The present invention relates to a process utilizing known electro-dialysis equipment for producing aqueous solutions of sodium, ammonium or magnesium sulphite or hydrogen sulphite from calcium sulphite or calcium hydrogen sulphite. More particularly, the invention relates to a process for electrodialyzing an aqueous solution of calcium sulphite or hydrogen sulphite with a second solution, that includes a solute, preferably in the form of a commercially available salt, corresponding to the sulphite or hydrogen sulphite to be produced, e.g., sodium, ammonium or magnesium chloride, or from any other available salt solution containing the corresponding base cation.

At present, such aqueous sulphite solutions are produced by absorption of sulphur dioxide in solutions of the corresponding hydroxides or carbonates which known procedures require the use of materials that are becoming increasingly more scarce and expensive. Therefore, a production process is needed which uses low-cost starting materials. Whereas these currently used sodium, ammonium or magnesium hydroxides and carbonates are relatively expensive, their salts, e.g., sodium, magnesium and ammonium chloride, are available in large quantities and at low-cost; as natural raw materials and, in some industries, as waste products.

BRIEF DESCRIPTION OF INVENTION

The method of this invention utilizes aqueous solutions of available, naturally occurring or otherwise inexpensive source of salts of sodium, magnesium or ammonium for flow through known electro-dialyzing equipment that includes a plurality or stack of cells separated by membranes, to react with aqueous solutions of calcium sulphite or calcium hydrogen sulphite to produce the desired aqueous solution (product solution) of the sulphite of sodium, magnesium or ammonium or their respective hydrogen sulphites and an aqueous solution of a useful by-product. The solutions to be electro-dialyzed are made to flow through different cells of the electro-dialyzer that are separated on the one hand from one another by a similar cell through which a dilute solution of the product passes and on the other hand by a cell through which a solution of by-product passes. The electrical energy supplied across the stack of cells of the electro-dialyzer causes the ions in the several solutions to migrate through the separating membranes forming the walls of their respective cells, the arrangement being such that certain of the ions migrate into the product solution to produce additional sodium, ammonium or magnesium sulphite or hydrogen sulphite as the case may be, while others migrate into the by-product solution to produce additional by-product.

The desired sodium, ammonium or magnesium sulphite or hydrogen sulphite solution and the by-product solution are then recovered. A portion of the effluent from the respective reaction chambers may be recirculated to produce a constant inflow concentration in the cells through which the solution flow so that a continuous production of, for example, an aqueous solution of a desired concentration of $NaHSO_3$ and solution of $CaCl_2$ can be accomplished.

It is therefore an object of this invention to provide a method for utilizing known electro-dialyzing equipment for producing sodium, ammonium or magnesium sulphite or hydrogen sulphite.

Another object of this invention is to provide a method for reacting readily available salts of sodium, ammonium or magnesium in a electro-dialyzer to produce their respective sulphites or hydrogen sulphites.

Another object of this invention is to provide a method for using a stack of electro-dialyzing cells to react a readily available aqueous salt solution with calcium sulphite or calcium hydrogen sulphite to produce sodium, magnesium or ammonium sulphite or hydrogen sulphite.

Another object of the invention is to provide an electrodialysis process that may be automated with known means for the production of sodium, ammonium or magnesium sulphite or hydrogen sulphite.

Another object of this invention is to provide a continuously operative method for producing an aqueous solution of sodium, magnesium or ammonium sulphite or hydrogen sulphite of desired concentration together with a useful byproduct.

DRAWING

The single FIGURE shows a flow sheet of the method of this invention.

DETAILED DESCRIPTION

The process of this invention makes use of an electrodialysis unit which is designed as a multi-cell stack with alternating anion-and cation-selective membranes for receiving the feed solutions consisting of a calcium sulphite or calcium hydrogen sulphite solution and a second salt solution of the desired base cation that is converted into the desired sulphite or hydrogen sulphite of the cation by electrochemical ion exchange. A by-product of this process is the concurrent production of an aqueous calcium salt solution.

In the practice of the process according to this invention, the individual cells of the electrodialysis unit are connected to suitable fluid circulating means, not shown, to produce a flow of the feed solutions, a flow of product and by-produce solutions, and also a flow of one or more electrode rinse streams. The cells are stacked to receive the several circulating solutions such that a first aqueous feed solution containing calcium ions and sulphite or hydrogen sulphite ions (i.e., either calcium sulphite or calcium hydrogen sulphite) flows through a first set of cells in the stack and a second aqueous feed solution containing a salt of the desired base cation to be reacted with the sulphite ions in the first solution flows through a second set of different cells in the stack. Dilute solutions of the desired product and the by-product salt are made up to flow through two additional third and fourth sets of cells, the solutions being formed, preferably, from water and recycled effluent.

The several cells of all of the sets are arranged side by side in the electro-dialyzer so that the first and second solutions are alternately disposed on the opposite sides of one each of the cells forming the third and fourth sets of cells.

The calcium sulphite and calcium hydrogen sulphite used in this process can be readily produced at low cost and by known procedures from sulphur dioxide and lime. Thus, with the process according to the invention, the desired sulphite or hydrogen sulphite solutions can be produced using, besides sulphur dioxide, only the low-cost starting materials of lime and salts of the bases corresponding to the sulphites or hydrogen sulphites to be produced, e.g., sodium, ammonium or magnesium chloride.

The electrodialysis technology on which the process according to the invention is based is already being used on an industrial scale for the desalination of seawater and brackish water and for the desalination or concentration of aqueous solutions of electrolytes in waste water technology and in the food processing industry. The present process can thus be carried out using only slightly modified existing technologies and apparatus, which is highly advantageous for the implementation of the process.

Contrary to the known applications of electro-dialysis for desalination or concentration, the special arrangement of the cells of the electrodialysis unit as taught herein, makes use of the selective ion exchange membranes and the passage of the various streams of electrolytes in the sequence described above. In following this invention, a continuous electrochemical ion exchange is effected in the desired way to produce the sodium, magnesium or ammonium sulphite or hydrogen sulphite and a useful by-product or aqueous solution of a separable salt. By using the multi-cell electrodialysis unit according to the present invention, the process may be carried out in a relatively compact area and can easily be automated by means of conventional devices, not shown herein, for the easy and exact control of throughput and electric current.

The multi-cell electrodialysis unit — generally known as a membrane stack — which is to be used for carrying out the process according to the invention, consists of alternatingly arranged anion- and cation-selective ion exchange membranes that are commercially available. Between the individual membranes, cell frames are arranged which hold spacers (mostly consisting of extruded plastic mesh) that serve to prevent adjacent membranes from coming into contact with each other and to provide a uniform turbulent flow across the entire surface of the membranes. The resulting membrane stack is arranged between end plates which hold the electrodes and have boreholes for the required circulation of the liquid streams. The stack is usually compressed by tie rods so that the multi-cell stack is sealed towards the outside by rubber-covered rims on the cell frames or spacers.

The required liquid streams are fed into and discharged from the stack through the boreholes in the end plates with liquid distribution within the stack being effected through suitable conduits and appropriately arranged boreholes in the separators and membranes. Conventional electrodialysis units generally comprise electrode rinse conduits and two electrolyte conduits for the dialysate and the concentrate. For the process according to the invention, however, besides the two electrode rinse conduits, four electrolyte conduits are required, which are passed by the aforementioned solutions in the described order.

As can be seen from the attached process flow sheet, the electrodialysis unit used for the present process, makes use of a multi-cell stack formed by anion selective membranes A alternating with cation-selective membranes C positioned between electrodes 7,8. As schematically shown, electrode rinse conduits 1 and 6 for electrodes 7 and 8 are connected to a recirculating flow of rinse streams. In a typical example, an aqueous sodium salt solution is circulated through the rinse conduits when either sodium sulphite or sodium hydrogen sulphite is to be produced.

In the cathode rinse cell 1, an alkaline medium is formed in accordance with the reaction:

while hydrogen is set free. In the anode rinse cell 6, free oxygen and acid is produced according to the reaction:

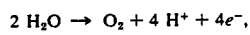

and the use of rinse streams containing chloride results in the additional formation of chlorine according to:

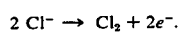

In many cases it is advantageous to let the two streams of acidic and alkaline rinse streams follow each other to achieve mutual neutralization.

Using the example given above of the process according to the invention, four additional and separate streams are provided for feeding water and the desired aqueous solutions into adjacent cells of the electrodialysis unit. For example, an aqueous NaCl solution is passed through a first cell 2 adjacent cathode cell 1 which is separated therefrom by a cation selective membrane C. A solution of water and the by-product $CaCl_2$ is passed through the next cell 3 adjacent cell 2 and separated therefrom by a anion-selective membrane A. An aqueous solution of $Ca(HSO_3)_2$ is then passed through cell 4, which is separated from cell 3 by a cation-selective membrane and a dilute solution of water and the desired product $NaHSO_3$ is circulated through cell 5 which is separated from cell 4 by an anion selective membrane A. If this were one unit, cell 5 would then be followed by NaCl chamber 2″, anode rinse cell 6 and anode 8 to complete the unit. This combination of cells 2–5 can then be considered as the basic unit which can be duplicated up to 100 units between the two electrodes 7 and 8. In the drawing, two basic cell structures are shown, the second unit being represented by the numerals 2′–5′.

Cells of the same type can be connected in series, to achieve a higher concentration of the electrolyte or in parallel to increase the throughput. The attached flow sheet shows an embodiment of the invention with parallel connection. When applying d.c. voltage of adequate polarization to the electrodes, the cations flow to cathode 7 and the anions to anode 8.

With the arrangement of anion and cation exchange membranes and the liquid streams of the example shown in the attached flow sheet, the selectivity of the membranes A and C results in increasing the concentration of the $CaCl_2$ solution (the by-product stream) and the $NaHSO_3$ solution (the product stream) in cells 3 and 5, respectively, while decreasing the concentration of the NaCl and $Ca(HSO_3)_2$ solutions (the feed streams) in cells 2 and 4, respectively. In this process, and with reference to the basic unit of cells 2–5, $Na^+$ ions from cell 2′ in the next adjacent unit (or cell 2″ if the cell consisted of only one unit) and $HSO_3^-$ ions from cell 4 migrate into cell 5, while $Cl^-$ ions from cell 2 and $Ca^{++}$ ions from cell 4 migrate into cell 3. The process can be described by the equation:

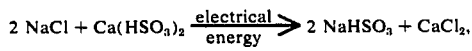

$$2\ NaCl + Ca(HSO_3)_2 \xrightarrow[energy]{electrical} 2\ NaHSO_3 + CaCl_2,$$

and thus constitutes a continuous electrochemical ion exchange process.

The described multi-cell stack has substantial advantages over three- or five-cell stacks with a different arrangement of the ion exchange membranes in that the $CaCl_2$ and $NaHSO_3$ solutions obtained with the embodiment of the invention, whose final concentration is higher than their initial concentration, contain no impurities from the electrolytes of the starting solutions and for one Faraday equivalent, "$n$" equivalents of salt are transferred, where "$n$" designates the number of basic units of cells 2 to 5 between the two electrodes.

When carrying out the process according to the invention, it is of utmost importance that electrodialysis takes place without concentration polarization. Concentration polarization occurs when the ion flow due to the electric field equals or exceeds the diffusion-induced ion flow at the electrolyte/membrane interface. This results in hydrogen or hydroxyl ions participating in the current transport so that a shift in the pH value is encountered. This not only leads to a decrease in the current efficiency but there is also the risk of slightly soluble salts being deposited, especially on the anion-selective membranes, which deposition produces scaling that increases the membrane resistance and impedes ion transport through the membrane. Since calcium forms several slightly soluble salts (e.g. calcium carbonate by reaction with atmospheric carbon dioxide), it is preferred that the electrolyte of the by-product be acidified (in this case the calcium chloride solution) with hydrochloric acid which can simply be added to the water in-flow in accordance with known procedures to prevent salt deposition on the membranes.

Industrial electrodialysis apparatus of this type can be constructed according to conventional design principles for electrodialysis units as described, for example, by M. S. Mintz in Ind. Engineering Chem. 55 (1963) 6, 18–28.

The attached flow sheet is based on a process in which constant input concentration is achieved by replacing appropriate proportions of the $CaCl_2$ and $NaHSO_3$ solutions with water; the converted $NaCl$ and $Ca(HSO_3)_2$ being also replaced continuously. This bleed-and-feed process thus permits the continuous production of $NaHSO_3$ solution of constant concentration, the by-product being $CaCl_2$ solution.

The above description covers the preferred mode of operation of our method. An example of the continuous formation of sodium hydrogen sulphite in an aqueous solution has been set forth. It is apparent that if calcium sulphite is substituted for calcium hydrogen sulphite on the infeed that the same procedure can be used for the production of sodium sulphite. Similarly, ammonium and magnesium chloride salts may be substituted for the sodium chloride salt indicated on the drawing to produce aqueous solutions of ammonium or magnesium sulphite or hydrogen sulphite. Further, other salts of ammonium, sodium and magnesium may be used as a starting material such as fluorides, bromides, and also hydroxides.

These and other modifications of this method may occur to those skilled in the art that will fall within the scope of the following claims.

We claim:

1. A process for producing an aqueous solution of a solute product selected from the group consisting of sodium sulphite, sodium hydrogen sulphite, ammonium sulphite, ammonium hydrogen sulphite, magnesium sulphite and magnesium hydrogen sulphite by electrodialysis between a first aqueous feed solution of a solute selected from the group consisting of calcium sulphite and calcium hydrogen sulphite and a second aqueous feed solution of a chloride salt selected from the group consisting of sodium, ammonium and magnesium chloride, said electrodialysis producing the solute product and calcium chloride as a by-product wherein the electrodialysis is performed in a multi-cell stack electrodialysis unit having an anode and a cathode electrode and alternately arranged anion and cation selective membranes between the cells thereof, which comprises flowing the first aqueous feed solution through a first cell having a cation selective membrane separating it from the cell on one side and an anion selective membrane separating it from the cell on the other side; flowing a dilute aqueous solution of the by-product through the cell adjacent the cation selective membrane side of the first cell and a dilute aqueous solution of the solute product through the cell adjacent the anion selective membrane side of the first cell and passing the second aqueous feed solution of the chloride salt through cells on each of the other sides of the product and by-product cells, the second feed solution cell being separated from the by-product cell by an anion selective membrane and from the product cell by a cation selective membrane whereby when d.c. voltage of adequate polarization is applied to the electrodes of said multi-cell stack, the ions of said first and second aqueous feed solutions pass through the separating membranes to produce the product solute in the product cell and calcium chloride in the by-product cell.

2. A process for producing an aqueous solution of a solute product selected from the group consisting of sodium sulphite, sodium hydrogen sulphite, ammonium sulphite, ammonium hydrogen sulphite, magnesium sulphite and magnesium hydrogen sulphite by electrodialysis between a first aqueous feed solution of a solute selected from the group consisting of calcium sulphite and calcium hydrogen sulphite and a second aqueous feed solution of a soluble salt of a base cation selected from the group consisting of sodium, ammonium and magnesium, said electrodialysis producing the solute product and a calcium salt as a by-product, wherein the electro-dialysis is performed in a multi-cell stack electrodialysis unit having an anode and a cathode electrode and alternately arranged anion and cation selective membranes between the cells thereof, which comprises flowing the first aqueous feed solution through a first cell having a cation selective membrane separating it from the cell on one side and an anion selective membrane separating it from the cell on the other side; flowing a dilute aqueous solution of the by-product through the cell adjacent the cation selective membrane side of the first cell and a dilute aqueous solution of the solute product through the cell adjacent the anion selective membrane side of the first cell and passing the second aqueous feed solution of the salt through cells on each of the other sides of said product and by-product cells, the second feed solution cell being separated from the by-product cell by an anion selective membrane and from the product cell by a cation selective membrane whereby when d.c. voltage of adequate polarization is applied to the electrodes of said multi-cell stack, the ions of said first and second aqueous feed solutions pass through the separating membranes to produce the product solute in the product cell and the by-product calcium salt in the by-product cell.

3. The process of claim 2 wherein said aqueous feed solutions and product and by-product solutions flow continuously through said respective cells.

4. The process of claim 3, wherein at least a portion of the effluent containing the aqueous solution of the product solute is recirculated to increase the concentration of the product in the effluent.

5. The process of claim 3, wherein at least a portion of the effluent containing the aqueous solution of the calcium salt is recirculated to increase its concentration in the effluent.

6. The process of claim 3, including recirculating the effluent of the first and second feed solutions back to their respective cells.

7. The process of claim 3, wherein the salt of the base cation is selected from the group consisting of bromides, fluorides, chlorides and hydroxides.

8. The process of claim 3, wherein said second aqueous salt solution includes a salt selected from the group consisting of sodium chloride, ammonium chloride and magnesium chloride.

9. A process for production of an aqueous solution containing a salt product selected from the group consisting of ammonium sulphite, ammonium hydrogen sulphite, magnesium sulphite, magnesium hydrogen sulphite, sodium sulphite and sodium hydrogen sulphite and also producing a salt by-product in an electrodialysis apparatus having a stacked multi-cell structure with a positive and negative electrode means at the opposite ends of the stack, comprising arranging the membranes of said apparatus in alternate anion and cation selective relationship, said alternately arranged membranes forming walls defining a plurality of cells, flowing a first aqueous solution containing calcium sulphite or calcium hydrogen sulphite through a first set of cells, flowing a second aqueous salt solution having base cations therein selected from the group consisting of sodium, ammonium and magnesium through a second set of cells, flowing a third aqueous solution of said product salt through a third set of cells, and feeding a fourth aqueous solution of said by-product salt through a fourth set of cells, imposing a d.c. voltage of adequate polarization to the electrodes across said stacked multi-cell structure, and feeding said aqueous solutions into their respective sets of cells arranged so that said individual cells through which said first and second aqueous solutions flow are arranged in said stack with one of said first cells and one of said second cells on the opposite sides of each of one of said cells from the respective third and fourth sets through which said third and fourth aqueous solutions flow whereby the concentration of the salts flowing in the aqueous solutions through said third and fourth sets of cells is increased.

10. Process of producing aqueous solutions of sodium, ammonium or magnesium sulphite or hydrogen sulphite from calcium sulphite or calcium hydrogen sulphite and from a second salt solution, i.e., a salt solution of the base corresponding to the sulphite or hydrogen sulphite to be produced, e.g., sodium, ammonium or magnesium chloride, characterized in that an electrodialysis unit is used which is designed as a multi-cell stack with alternately arranged anion- and cation-selective membranes (A and C) and in which the calcium sulphite or calcium hydrogen sulphite solution together with the second salt solution is converted into the desired sulphite or hydrogen sulphite solution by electrochemical ion exchange, a by-product of this process being a calcium salt solution, and in that various solutions flow through the individual cells of the electrodialysis unit in the following order: salt solution of the corresponding base, salt solution of the by-product, calcium sulphite or calcium hydrogen sulphite solution, and the end product, the sulphite or hydrogen sulphite solution of the corresponding base.

* * * * *